United States Patent
Morita

(10) Patent No.: US 10,440,094 B2
(45) Date of Patent: Oct. 8, 2019

(54) SYSTEM FOR RESTRICTING REMOTE OPERATION COMMAND IF NOT FROM RELAY DEVICE

(71) Applicant: CANON KABUSHIKI KAISHA, Tokyo (JP)

(72) Inventor: Hiroyasu Morita, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 70 days.

(21) Appl. No.: 15/877,250

(22) Filed: Jan. 22, 2018

(65) Prior Publication Data

US 2018/0213019 A1   Jul. 26, 2018

(30) Foreign Application Priority Data

Jan. 24, 2017   (JP) .................. 2017-010746

(51) Int. Cl.
| | | |
|---|---|---|
| H04L 29/08 | (2006.01) | |
| H04N 1/00 | (2006.01) | |
| H04L 29/06 | (2006.01) | |
| G06F 16/955 | (2019.01) | |

(52) U.S. Cl.
CPC .......... *H04L 67/02* (2013.01); *G06F 16/9566* (2019.01); *H04L 67/141* (2013.01); *H04L 67/28* (2013.01); *H04L 67/34* (2013.01); *H04L 67/40* (2013.01); *H04L 67/42* (2013.01); *H04N 1/00416* (2013.01)

(58) Field of Classification Search
CPC .... G06F 16/9566; G06F 16/954; G06F 19/00; G06F 21/554; G06F 21/88; H04L 67/02; H04L 67/141; H04L 67/28; H04L 67/34; H04L 67/40; H04L 67/42; H04L 67/10; H04L 63/20; H04N 1/00416; H04M 1/72522; H04M 3/38; H04W 12/06; H04W 12/08

See application file for complete search history.

(56) References Cited

U.S. PATENT DOCUMENTS

| | | | |
|---|---|---|---|
| 2006/0293029 A1* | 12/2006 | Jha ................... | H04M 1/72522 455/411 |
| 2011/0314515 A1* | 12/2011 | Hernoud ............... | H04W 12/06 726/2 |
| 2012/0028624 A1* | 2/2012 | Jedlicka ................. | H04M 3/38 455/418 |
| 2013/0174228 A1* | 7/2013 | Etchegoyen .......... | H04W 12/08 726/4 |
| 2014/0095894 A1* | 4/2014 | Barton .................... | H04L 67/10 713/190 |
| 2014/0113593 A1* | 4/2014 | Zhou ........................ | H04L 63/20 455/411 |
| 2014/0130105 A1* | 5/2014 | Reisman ............... | G06F 16/954 725/63 |
| 2016/0066189 A1* | 3/2016 | Mahaffey ................ | G06F 21/88 455/405 |
| 2016/0328577 A1* | 11/2016 | Howley ................. | G06F 19/00 |
| 2017/0222815 A1* | 8/2017 | Meriac ................. | G06F 21/554 |

FOREIGN PATENT DOCUMENTS

JP   2014-059720 A   4/2014

* cited by examiner

Primary Examiner — Le H Luu
(74) Attorney, Agent, or Firm — Canon U.S.A., Inc. IP Division

(57) ABSTRACT

While a support apparatus is remotely operating an information processing apparatus via a relay server, remote operation of the information processing apparatus by another apparatus other than the support apparatus is restricted.

9 Claims, 10 Drawing Sheets

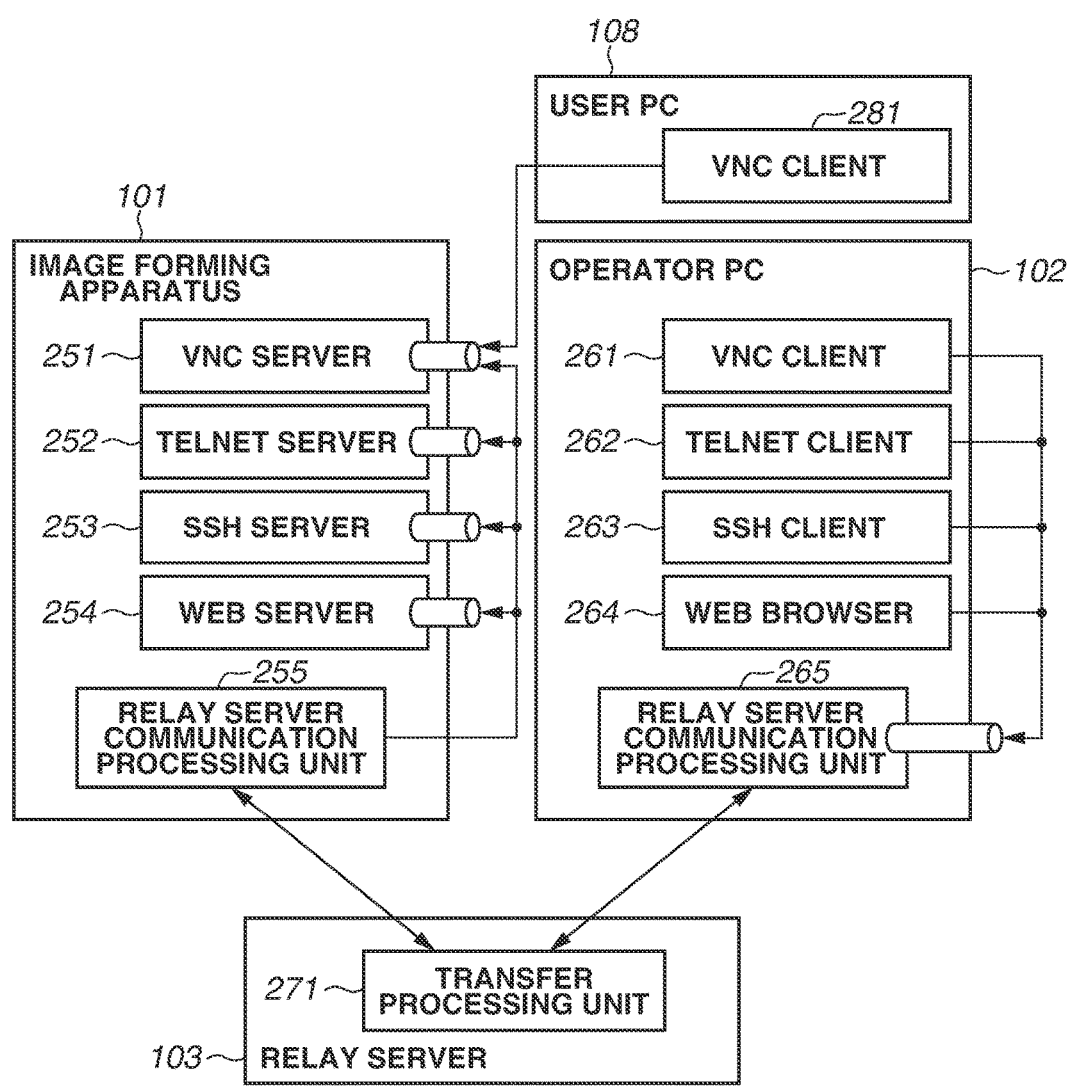

SYSTEM FOR RESTRICTING REMOTE OPERATION COMMAND IF NOT FROM RELAY DEVICE

BACKGROUND

Field

The present disclosure relates to a technique for operating an information processing apparatus via a network.

Description of the Related Art

A technique for making support operations for solving a problem of an information processing apparatus via a network has been known heretofore. Japanese Patent Application Laid-Open No. 2014-059720 discusses connecting an image forming apparatus with an operation terminal (support apparatus), which a serviceperson in a service center operates, via a network and remotely operating the image forming apparatus from the support apparatus. In order for the support apparatus to operate the image forming apparatus, the technique discussed in Japanese Patent Application Laid-Open No. 2014-059720 uses a technique called Virtual Network Computing (VNC).

According to Japanese Patent Application Laid-Open No. 2014-059720, the image forming apparatus operates as a VNC server and the support apparatus operates as a VNC client. The VNC server accepts a connection from the VNC client, whereby the VNC client can remotely operate the image forming apparatus.

From the viewpoint of security, some users of information processing apparatuses desire to restrict operation of the information processing apparatuses by an external apparatus via a network.

If, however, the function of accepting remote operation by an external apparatus via a network is constantly enabled, the operation from the external apparatus is not able to be restricted based on the users' intention.

SUMMARY

According to an aspect of the present disclosure, an information processing apparatus includes a memory device that stores a set of instructions, and at least one processor that executes the set of instructions to establish a connection with a support apparatus via a relay apparatus, make a data acquisition request to the relay apparatus, obtain, as a response to the data acquisition request, an operation command to remotely operate the information processing apparatus, the operation command being transmitted from the support apparatus to the relay apparatus, operate the information processing apparatus based on the obtained operation command, operate, in a case where the information processing apparatus is not communicating with the support apparatus via the relay apparatus, the information processing apparatus based on receipt of a remote operation command from another apparatus other than the relay apparatus, and restrict, in a case where the information processing apparatus is being remotely operated by the support apparatus via the relay apparatus, operating the information processing apparatus based on the receipt of the remote operation command from the another apparatus.

Further features will become apparent from the following description of exemplary embodiments with reference to the attached drawings.

BRIEF DESCRIPTION OF THE DRAWINGS

FIG. 2B is a diagram illustrating a software configuration of the information processing system according to an exemplary embodiment.

DESCRIPTION OF THE EMBODIMENTS

Figure 1:
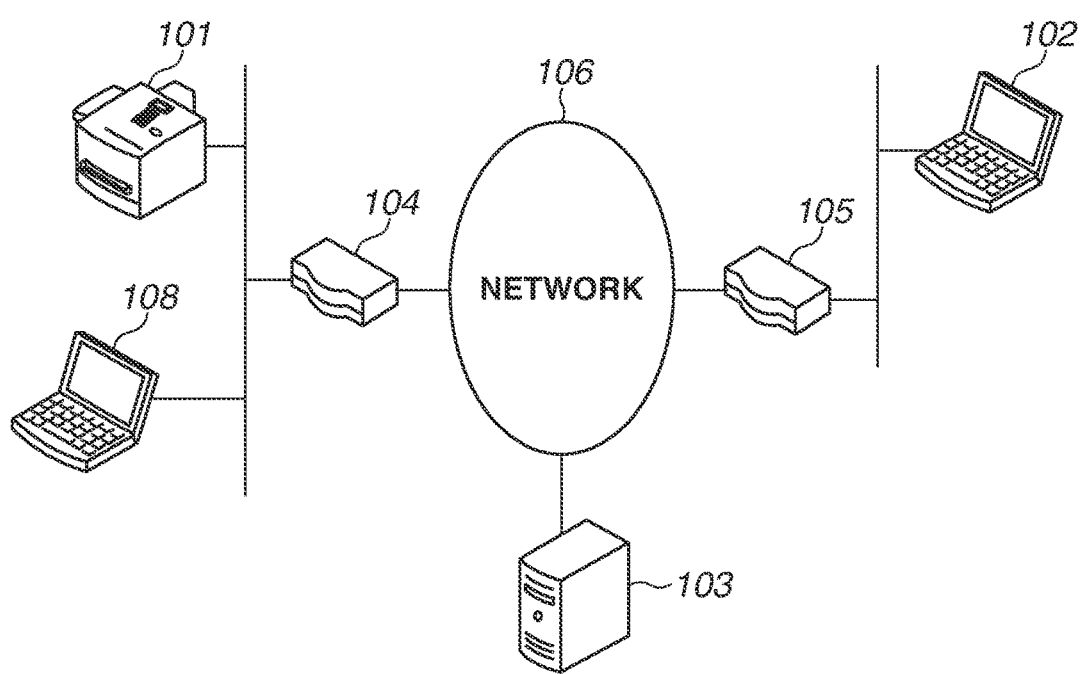
FIG. 1 is a diagram illustrating a network configuration according to an exemplary embodiment.

An exemplary embodiment will be described below. Specific exemplary embodiments to be described below can be useful in understanding various concepts of the present disclosure, including superordinate, intermediate, and subordinate concepts thereof. A technical scope of the present disclosure is defined by the claims and not by the following specific exemplary embodiments.

<Network Configuration>

A first exemplary embodiment will be described below. A network configuration of an information processing system for performing remote support according to the present exemplary embodiment will initially be described with reference to FIG. 1.

In the present information processing system, an image forming apparatus 101 serving as an information processing apparatus, an operator personal computer (PC) 102, and a relay server 103 are configured to enable communication with each other. The image forming apparatus 101 and a user PC 108 are also configured to enable communication with each other.

In the information processing system according to the present exemplary embodiment, for example, the operator PC 102 is an operation terminal which an operator in a service center operates. For example, if a problem occurs in the image forming apparatus 101, the user requests the operator (serviceperson) in the service center to solve the problem. The operator then makes an operation, via the relay server 103, to change settings of the image forming apparatus 101 or display a still image or moving image of an instruction manual on a display unit of the image forming apparatus 101. The setting change can solve the problem. The displayed still or moving image can be used to instruct the user how to solve the problem.

In a remote support service according to the present exemplary embodiment, the image forming apparatus 101 and the operator PC 102 operate as each other's communication partners. The user PC 108 is a support apparatus for supporting a support operation on the image forming apparatus 101. Examples of the support operation include the operator's operating the image forming apparatus 101 via the network 106 to investigate the cause of the problem occurring in the image forming apparatus 101. Another example is an operation by which the operator changes settings of the image forming apparatus 101 via the network 106 to solve the problem occurring in the image forming apparatus 101. Yet another example is an operation for displaying a still or moving image for prompting the user to perform an operation needed to solve the problem of the image forming apparatus 101 on the display unit of the image forming apparatus 101 based on instructions from the operator PC 102. The purpose of a support operation is not limited to solving a problem of the image forming apparatus 101. Regular maintenance operations may also be intended. The image forming apparatus 101 is a supported apparatus to be supported by the user PC 108.

The image forming apparatus 101 and the operator PC 102 communicate via the relay server 103. The image forming apparatus 101 and the operator PC 102 have a data communication function for executing call control to perform data communication by using the Hypertext Transfer Protocol (HTTP). The image forming apparatus 101 and the user PC 108 communicate via a local area network (LAN).

As illustrated in FIG. 1, the image forming apparatus 101 is connected to the network 106 through a firewall (FW) 104. The operator PC 102 on the service center side is connected to the network 106 through a FW 105. The relay server 103 is also connected to the network 106. In HTTP-based data communication, client nodes perform data communication with each other by issuing POST/GET requests to Uniform Resource Identifiers (URIs) provided by the relay server 103. The client nodes can thus perform data communication with each other even if blocked by private address areas or FWs.

In the present exemplary embodiment, the image forming apparatus 101 and the operator PC 102 operate as HTTP client nodes. In the present exemplary embodiment, the client nodes are described to be configured to communicate with the network 106 via the FWs. However, the present disclosure is not limited thereto. A network configuration without a FW may be applied. The network 106 may be connected with FWs, image forming apparatuses, and operator PCs more than illustrated. In the present exemplary embodiment, the communication protocol does not need to be HTTP.

<Hardware Configuration>

Figure 2A:
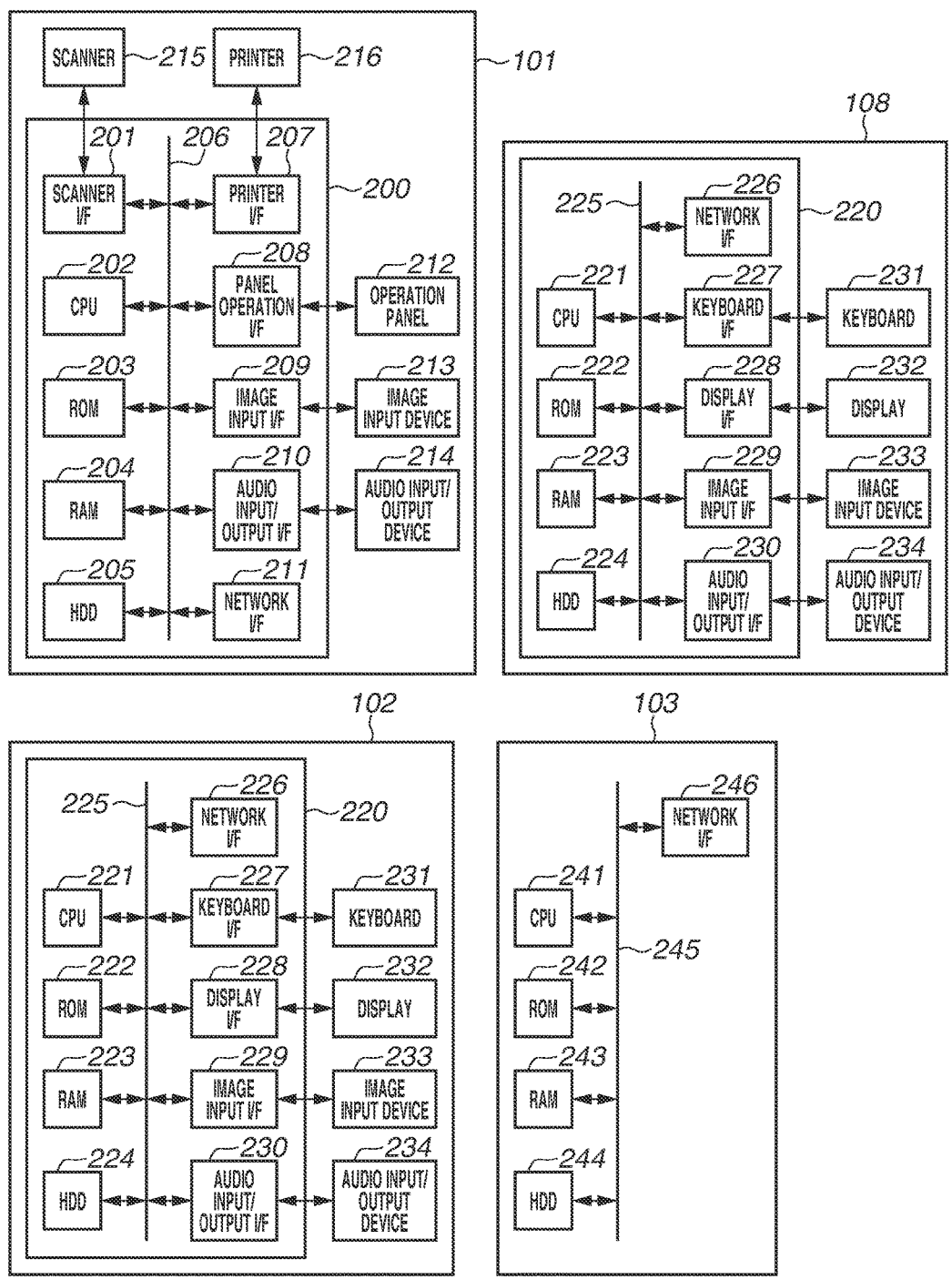
FIG. 2A is a diagram illustrating a hardware configuration of an information processing system according to an exemplary embodiment.

Next, a hardware configuration of the information processing system according to the present exemplary embodiment will be described with reference to FIG. 2A. The image forming apparatus 101 includes a system control unit 200, an operation panel 212, an image input device 213, an audio input/output device 214, a scanner 215, and a printer 216. The system control unit 200 includes a scanner interface (I/F) 201, a central processing unit (CPU) 202, a read-only memory (ROM) 203, a random access memory (RAM) 204, a hard disk drive (HDD) 205, a printer I/F 207, a panel operation I/F 208, an image input I/F 209, an audio input/output I/F 210, and a network I/F 211. Such devices can transmit and receive data to/from each other via a system bus 206.

The CPU 202 controls connection with various devices connected to the system bus 206 in a centralized manner based on a control program stored in the ROM 203 or the HDD 205. The ROM 203 stores control programs executable by the CPU 202. The RAM 204 mainly functions as a main memory and a work area of the CPU 202. The memory capacity of the RAM 204 can be extended by an optional RAM connected to a not-illustrated extension port. The HDD 205 stores, for example, a boot program, various applications, font data, user files, and edit files. While the present exemplary embodiment uses the HDD 205, an external storage device, such as a Secure Digital (SD) card and a flash memory, may be used aside from the HDD 205.

The scanner I/F 201 controls image input from the scanner 215. The printer I/F 207 controls image output to the printer 216. The panel operation I/F 208 controls display of the operation panel 212 and controls input of various types of setting information set on the operation panel 212. The image input I/F 209 controls image input from the image input device 213, such as a camera. The audio input/output I/F 210 controls audio input and output from/to the audio input/output device 214, such as a headset. The network I/F 211 performs data communication with an external network via a network cable.

The operator PC 102 includes a control unit 220, a keyboard 231, a display 232, an image input device 233, and an audio input/output device 234. The control unit 220 includes a CPU 221, a ROM 222, a RAM 223, an HDD 224, a network I/F 226, a keyboard I/F 227, a display I/F 228, an image input I/F 229, and an audio input/output I/F 230.

The CPU 221 controls connection with various devices connected to a system bus 225 in a centralized manner based on a control program stored in the ROM 222 or the HDD 224. The ROM 222 stores control programs executable by the CPU 221. The RAM 223 mainly functions as a main memory and a work area of the CPU 221. The memory capacity of the RAM 223 can be extended by an optional RAM connected to a not-illustrated extension port. The HDD 224 stores, for example, a boot program, various applications, font data, user files, and edit files. While the present exemplary embodiment uses the HDD 224, an external storage device, such as an SD card and a flash memory, may be used aside from the HDD 224.

The network I/F 226 performs data communication with an external network via a network cable. The keyboard I/F 227 controls key input from the keyboard 231 or a not-illustrated pointing device. The display I/F 228 controls display of the display 232. The image input I/F 229 controls image input from the image input device 233, such as a camera. The audio input/output I/F 230 controls audio input and output from/to the audio input/output device 234, such as a headset.

The user PC 108 has a configuration similar to that of the operator PC 102. The components are therefore designated by the same reference numerals, and a description thereof will be omitted.

The relay server 103 includes a CPU 241, a ROM 242, a RAM 243, an HDD 244, and a network I/F 246. The CPU 241 controls connection with various devices connected to a system bus 245 in a centralized manner based on a control program stored in the ROM 242 or the HDD 244. The ROM 242 stores control programs executable by the CPU 241. The RAM 243 mainly functions as a main memory and a work area of the CPU 241. The HDD 244 stores, for example, a boot program, various applications, font data, user files, and edit files. While the present exemplary embodiment uses the HDD 244, an external storage device such, as an SD card and a flash memory, may be used aside from the HDD 244. The network I/F 246 performs data communication with an external network via a network cable.

<Software Configuration>

Next, a software configuration of the information processing system according to the present exemplary embodiment will be described with reference to FIG. 2B. The image forming apparatus 101 includes a relay server communication processing unit 255 and server units including a virtual network computing (VNC) server 251, a Teletype network (Telnet) server 252, a Secure Shell (SSH) server 253, and a web server 254. The relay server communication processing unit 255 controls communication processing with the relay server 103. The relay server communication processing unit 255 performs processing for establishing communication with a support apparatus that performs maintenance operations on the image forming apparatus 101 via the network 106. The server units are pieces of software provided as ordinary functions of the image forming apparatus 101, not ones used only in the information processing system. The relay server communication processing unit 255 functions as a second communication control unit, and adjusts the communication protocols of the communication servers 251 to 254 and HTTP used for communication with the relay server 103 in a versatile manner.

The operator PC 102 includes a relay server communication processing unit 265 and client units including a VNC client 261, a Telnet client 262, an SSH client 263, and a web browser 264. The relay server communication processing unit 265 functions as a first communication control unit, and controls communication processing with the relay server 103. The client units are pieces of software provided to be commonly used in the operator PC 102, not ones used only in the information processing system. The relay server communication processing unit 265 adjusts the communication protocols of the communication clients 261 to 264 and HTTP used for communication with the relay server 103 in a versatile manner.

As in the operator PC 102, the user PC 108 includes a VNC client 281. The VNC client 281 connects to the VNC server 251 of the image forming apparatus 101 without the intervention of a relay server communication processing unit 255 or the relay server 103. In FIG. 2B, the user PC 108 is illustrated to include only the VNC client 281. However, this is not restrictive. The user PC 108 may include a Telnet client, an SSH client, and a web browser as in the operator PC 102.

The relay server 103 includes a transfer processing unit 271 which transfers communication of the image forming apparatus 101 and the operator PC 102. The relay server communication processing unit 255 performs processing for encapsulating communication data accepted from the servers 251 to 254 in HTTP so that the servers 251 to 254 of the server units can communicate with the relay server 103 by using HTTP. For example, the relay server communication processing unit 255 embeds VNC data output from the VNC server 251 in HTTP data, and transmits the resultant to the relay server 103. The same applies to the other servers 252 to 254. The relay server communication processing unit 255 also perform processing for extracting data corresponding to the communication protocols of the servers 251 to 254 from HTTP data received from the relay server 103, and delivering the extracted data to the respective servers 251 to 254.

In the present exemplary embodiment, the operator PC 102 is described to include the communication clients, and the image forming apparatus 101 the communication servers. However, the present disclosure is not limited thereto.

For example, the image forming apparatus 101 may include the communication clients, and the operator PC 102 the communication servers, in which configuration the image forming apparatus 101 requests connection to the operator PC 102. In FIG. 2B, cylindrical shapes conceptually represent HTTP tunneling in the case where the operator PC 102 connects to the image forming apparatus 101 to implement transmission of communication data. This is an example of the present disclosure. If, for example, the image forming apparatus 101 connects to the operator PC 102 to transmit communication data, the image forming apparatus 101 and the operator PC 102 have the cylinders in a reverse relationship to in FIG. 2B.

<Overall Processing>

Next, an overall operation flow of the information processing system according to the present exemplary embodiment will be described. In response to processing for starting remote support (described below) having been performed with a user operation on the image forming apparatus 101, the operator PC 102 and the image forming apparatus 101 each connect to the relay server 103. The relay server 103 pairs the two clients, so that the two clients enter a session established state. The session established state can be created by, for example, inputting the same numbers or character strings into the operator PC 102 and the image forming apparatus 101, and pairing them with the relay server 103. In such a manner, communication with the support apparatus via a predetermined communication path is established based on a start instruction for remote support. In the present exemplary embodiment, the predetermined communication path refers to, for example, the communication path between the image forming apparatus 101 and the operator PC 102 via the relay server 103.

After the entry to the session established state, the operator makes an operation to start VNC from the operator PC 102 and performs remote operation. In the present exemplary embodiment, the remote operation is described to use the communication protocol corresponding to VNC as an example. However, communication protocols, such as Telnet and SSH, may also be applied.

The operator performs the operation to start VNC on operator PC 102. On the basis of the operation to start VNC, a VNC connection request is transmitted from the operator PC 102 to the image forming apparatus 101. The VNC connection request is a request (operation instruction) that the operator PC 102 operate the image forming apparatus 101 via the network 106. Receiving the request, the image forming apparatus 101 connects the operator PC 102 to the VNC server 251 of the image forming apparatus 101. If the operator PC 102 is connected to the VNC server 251 of the image forming apparatus 101, an operation screen of the image forming apparatus 101 is displayed on the display 232 of the operator PC 102. The operator makes an operation on the operation screen displayed on the display 232. The information about the operation on the operation screen is transmitted to the image forming apparatus 101 via the relay server 103. The image forming apparatus 101 performs processing based on the information about the operation transmitted from the operator PC 102 via the relay server 103. In such a manner, the operator can perform maintenance on the image forming apparatus 101 via the network 106.

<Enabling Setting of Remote Support Function in Image Forming Apparatus 101>

Next, processing in which the user enables a remote support function of the image forming apparatus 101 will be described. The remote support function is a function for enabling remote operation of the image forming apparatus 101 by the operator PC 102. The remote support function is implemented through, for example, activation of software for implementing the relay server communication processing unit 255.

For example, in a case where the remote support function is enabled, the image forming apparatus 101 starts processing for connecting to the operator PC 102 with the user providing a predetermined operation to the image forming apparatus 101. Examples of the predetermined operation include an operation for continuously pressing a predetermined operation key for a predetermined time. In response to the pressing of the operation key, the pairing of the image forming apparatus 101 and the operator PC 102 is started, thus enabling remote support from the operator PC 102.

In a case where the remote support function is disabled, the processing for connecting to the operator PC 102 will not be started even when the user makes the predetermined operation on the image forming apparatus 101.

The user can set whether to enable or disable the remote support function from a setting screen 301 which is displayed when a predetermined operation is made on the operation panel 212 of the image forming apparatus 101. More specifically, the user switches between a setting to execute the remote support function based on a predetermined instruction for the image forming apparatus 101 and a setting not to execute the remote support function even under the predetermined instruction. The predetermined instruction refers to an instruction to start the remote support function. For example, the predetermined instruction is input by a user operation of pressing a predetermined key for a predetermined time. This is not restrictive, and the predetermined instruction may be input to the image forming apparatus 101 from an external apparatus.

Figure 3:
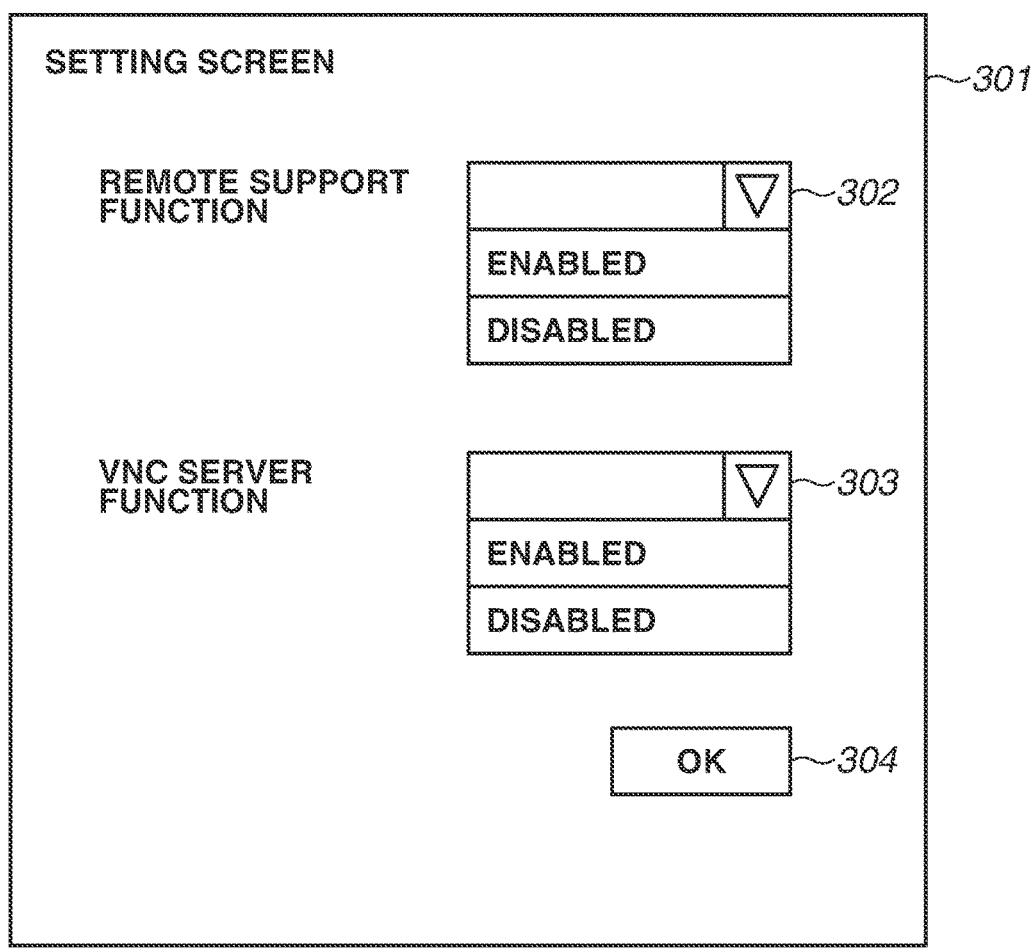
FIG. 3 is a diagram illustrating a setting screen for switching a remote support function and a Virtual Network Computing (VNC) server function between enabled and disabled.

FIG. 3 illustrates an example of the setting screen 301. The setting screen 301 displays a pull-down menu 302. The user can switch whether to enable or disable the remote support function by selecting either enabled or disabled from the pull-down menu 302 and pressing an OK button 304. In the example of FIG. 3, the pull-down menu 302 is described to be used to switch between enabled and disabled. However, the method for selecting enabled or disabled is not limited in particular. Radio buttons or a check box may be used for selection.

The setting screen 301 may be displayed on a display unit of the user PC 108 connected to the image forming apparatus 101 via the LAN so that the setting can be made from the user PC 108. For example, the user PC 108 accesses the web server 254 of the image forming apparatus 101 via a web browser. The web server 254 transmits the setting screen 301 as a web page to the web browser of the user PC 108, and the web page is displayed. The web server 254 obtains setting information input via the web page, and reflects the setting information on the image forming apparatus 101.

The setting screen 301 for setting whether to enable or disable the remote support function may be configured to be operable only by a user with predetermined authority. For example, the user may be requested to enter a password to display the setting screen 301.

In the foregoing example, the setting of the remote support function is manually switched by the user. However, this is not restrictive. For example, the remote support function may be automatically disabled if a security policy that restricts remote operation on the image forming apparatus 101 is applied by the administrator.

Figure 4A:
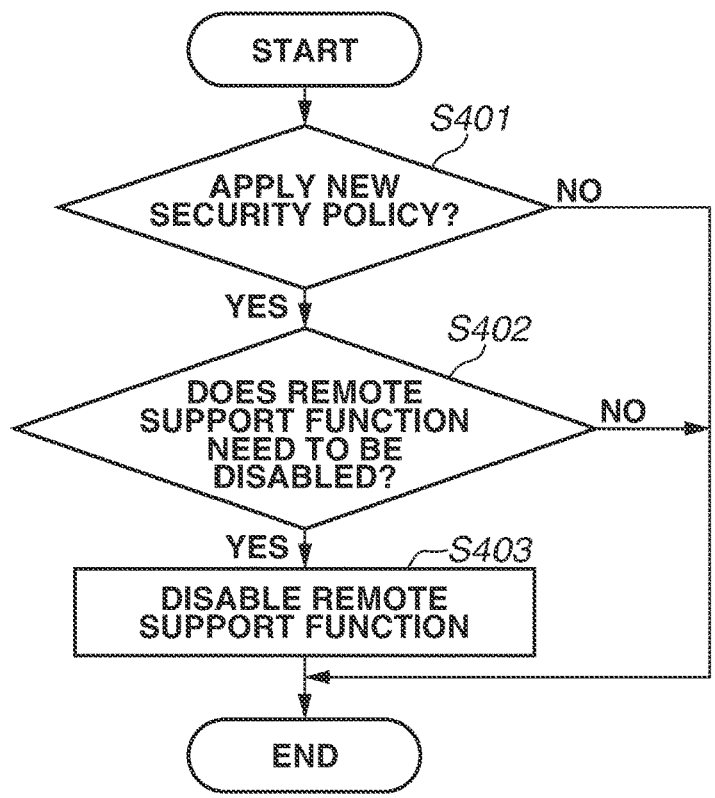
FIG. 4A is a flowchart of processing for disabling the remote support function in accordance with application of a security policy.

The processing for disabling the remote support function in accordance with the application of the security policy will be described with reference to FIG. 4A. The processing of FIG. 4A is implemented by, for example, the CPU 202 of the image forming apparatus 101, executing a program read from a storage medium, such as the ROM 203.

In step S401, the CPU 202 determines whether a new security policy is instructed to be applied to the image forming apparatus 101. If a new security policy is not applied (NO in step S401), the processing ends. If a new security policy is applied (YES in step S401), the processing proceeds to step S402. In step S402, the CPU 202 analyzes the details of the security policy and determines whether the remote support function needs to be disabled. In step S402, if it is determined that the remote support function does not need to be disabled (NO in step S402), the processing ends. If it is determined that the remote support function needs to be disabled (YES in step S402), the processing proceeds to step S403. In step S403, the CPU 202 sets the remote support function to disabled. In FIG. 4A, a description of functions other than the remote support function is omitted, whereas the functions other than the remote support function may be switched between enabled and disabled in accordance with the security policy.

In such a manner, the remote support function can be switched between enabled and disabled based on the application of the security policy.

The remote support function may be enabled or disabled in association with enabling or disabling of a function other than the remote support function.

For example, the Institute of Electrical and Electronic Engineers (IEEE) 2600.1, an international standard specification for evaluating appropriate design and proper implementation of information technology-related products and systems from the viewpoint of information technology security, requires the following. That a predetermined restriction be imposed on access from an external apparatus to the image forming apparatus 101. The administrator then may issue an instruction to set a plurality of setting values of the image forming apparatus 101 to predetermined values at once so that the image forming apparatus 101 meets the certification criteria of the foregoing specification. The remote support function may be disabled based on the issuance of such a batch setting instruction.

Figure 4B:
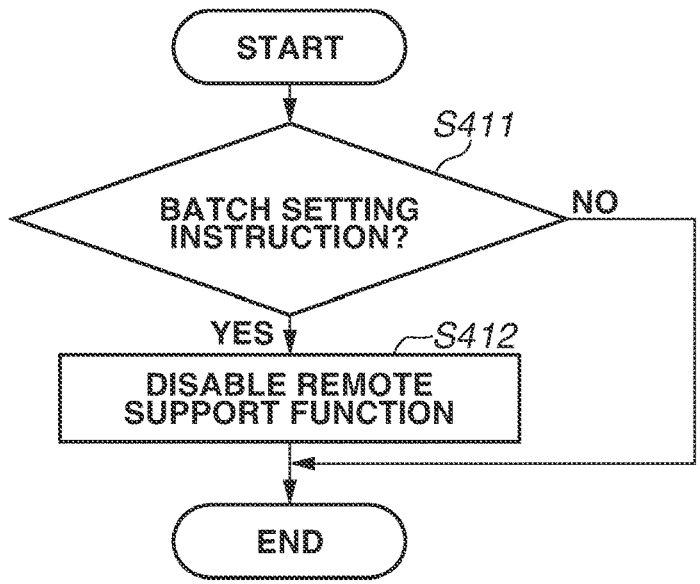
FIG. 4B is a flowchart of processing for disabling the remote support function according to a batch setting instruction.

An example of disabling the remote support function based on a batch setting instruction will be described with reference to FIG. 4B. The processing of FIG. 4B is performed by, for example, the CPU 202 of the image forming apparatus 101, executing a program read from a storage medium, such as the ROM 203.

In step S411, the CPU 202 determines whether a batch setting instruction to bring a plurality of settings of the image forming apparatus 101 into a predetermined state at once is given to the image forming apparatus 101. If a predetermined batch setting instruction is given (YES in step S411), the processing proceeds to step S412. In step S412, the CPU 202 disables the remote support function. If a predetermined setting instruction is not given (NO in step S411), the processing ends.

In such a manner, the remote support function can be disabled based on the issuance of a batch setting instruction.

<Enabling Setting of VNC Server Function in Image Forming Apparatus 101>

Next, processing in which the user enables or disables a VNC server function of the image forming apparatus 101 will be described. The VNC server function is a function for enabling acceptance of remote operation from the VNC client 261 and the VNC client 281 which are connected to the image forming apparatus 101 via the network 106. The VNC client 261 and the VNC client 281 may hereinafter be referred to collectively as VNC clients.

If the VNC server function is enabled, the VNC server 251 can accept a connection from a VNC client. In a case where the connection from the VNC client is accepted, the operation screen displayed on the operation panel 212 of the image forming apparatus 101 is displayed on the display unit of the information processing apparatus serving as the VNC client. The VNC client transmits an instruction input via the operation screen displayed on the display unit to the VNC server 251. The VNC server 251 instructs the image forming apparatus 101 to perform processing in accordance with the instruction accepted from the VNC client. The image forming apparatus 101 can thus be remotely operated from the VNC client.

In a case where the VNC server function is disabled, the VNC server 251 does not accept a connection from a VNC client. In such a manner, whether to enable operating the image forming apparatus 101 by VNC can be set.

As will be described below, the image forming apparatus 101 according to the present exemplary embodiment enables limited use of VNC functions when the remote support function uses VNC, even if the VNC server function is set to disabled. In other words, even if a setting not to enable operating the image forming apparatus 101 by VNC is made, the image forming apparatus 101 performs control to enable the operator PC 102 to operate the image forming apparatus 101 by VNC. Meanwhile, if the setting not to enable operating the image forming apparatus 101 by VNC is made, the image forming apparatus 101 performs control not to enable another apparatus than the operator PC 102 to operate the image forming apparatus 101 by VNC.

The user can set the VNC server function to enabled or disabled from the setting screen 301 which is displayed when a predetermined operation is made on the operation panel 212 of the image forming apparatus 101. In other words, the user can switch whether to enable or disable the VNC server function.

FIG. 3 illustrates an example of the setting screen 301. The setting screen 301 displays a pull-down menu 303. The user can switch whether to enable or disable the VNC server function by selecting enabled or disabled from the pull-down menu 303 and pressing the OK button 304. In the example of FIG. 3, the pull-down menu 303 is illustrated to be used to switch between enabled and disabled. However, the method for selecting enabled or disabled is not limited in particular. Radio buttons or a check box may be used for selection.

As in the setting of the remote support function, the setting screen 301 may be displayed on the display unit of the user PC 108 connected to the image forming apparatus 101 via the LAN, so that the setting can be made from the user PC 108.

The setting screen 301 for setting whether to enable or disable the VNC server function may be configured to be operable only by a user with predetermined authority. For example, the user may be requested to enter a password to display the setting screen 301.

In the foregoing example, the setting of the VNC server function is manually switched by the user. However, this is not restrictive. For example, the VNC server function may be automatically disabled if a security policy that restricts the use of VNC is applied to the image forming apparatus 101 by the administrator. The VNC server function may be enabled or disabled in association with enabling or disabling of a function other than the VNC server function.

In the example of FIG. 3, the enabling and disabling of the remote support function and the enabling and disabling of the VNC server function are described to be settable from the common setting screen 301. However, this is not restrictive. Different setting screens may be provided for the respective functions.

<Operation of VNC Server 251 when Remote Support Function is Enabled>

Next, a description will be provided of an operation of the VNC server 251 when the remote support function is enabled. In the present exemplary embodiment, if a VNC connection request is received after a start of remote support, the VNC server 251 is run in a VNC limited connection mode regardless of whether the VNC server 251 is set to enabled or disabled.

The VNC limited connection mode is a mode in which request sources to enable a connection to the VNC server 251 are limited. In the present exemplary embodiment, the VNC server 251, in the VNC limited connection mode, operates to enable a connection from the operator PC 102 to the VNC server 251 and not enable a connection from another apparatus than the operator PC 102. For example, the VNC server 251 operates to enable a connection from the VNC client 261 of the operator PC 102 and not enable a connection from the VNC client 281 of the user PC 108.

The operation in the VNC limited connection mode in a case where the remote support function is enabled has the following two advantages.

Firstly, the VNC server function can be used to get support, though solely for remote support purposes, even in a case where the remote support function is set to enabled and the VNC server function is set to disabled via the setting screen 301.

Secondly, if the operator PC 102 is connected to the VNC server 251, the VNC server 251 can be prevented from being connected with another apparatus than the operator PC 102 instead of the operator PC 102.

The second advantage will be described with an example where the VNC server 251 can accept a connection only from a single apparatus. Suppose that the VNC server function is enabled and a first VNC client is in connection with the VNC server 251. In a case where a second VNC client issues a connection request afterward, the connection with the first VNC client is disconnected. The connection of the second VNC client to the VNC server 251 is then accepted.

In a case where the remote support function is enabled, the VNC server function is set to enabled, and the VNC server 251 is not run in the VNC limited connection mode, then the following operation occurs.

Suppose that the VNC client 261 of the operator PC 102 is in connection with the VNC server 251, and the VNC client 281 of the user PC 108 issues a connection request afterward. In such a case, the VNC client 281 of the user PC 108 is connected to the VNC server 251 with priority over the operator PC 102. Since the connection between the operator PC 102 and the VNC server 251 is disconnected, the operator PC 102 is no longer able to remotely operate the image forming apparatus 101 for support.

To that end, in a case where the remote support function is enabled and the VNC server function is set to enabled, enabling the use of the VNC server function only for remote support purposes enables smooth support.

<Processing for Implementing VNC Limited Connection Mode>

Next, a mechanism for the image forming apparatus 101 to implement the VNC limited connection mode will be described.

In the present exemplary embodiment, in a case where the remote support function is enabled, the VNC server 251 enables connection only in a case where the Internet Protocol (IP) address of the request source requesting the connection is a local loopback address designating the own apparatus.

The relay server communication processing unit 255 transmits a VNC connection request to the VNC server 251 such that the request source address of the VNC connection request corresponding to a VNC connection request received from the operator PC 102 via the relay server 103 is to be the local loopback address.

In a case where the remote support function is enabled, the VNC server 251 therefore accepts the VNC connection request from the relay server communication processing unit 255. In a case where the remote support function is enabled, the VNC server 251 does not accept a connection request from the VNC client 281. The reason is that the request source address of the connection request is the address of the user PC 108.

In the VNC limited connection mode, a connection from the operator PC 102 to the VNC server 251 can thus be enabled while a connection from another apparatus than the operator PC 102 to the VNC server 251 is rejected.

<Enabling Processing in VNC Limited Connection Mode>

Figure 5:
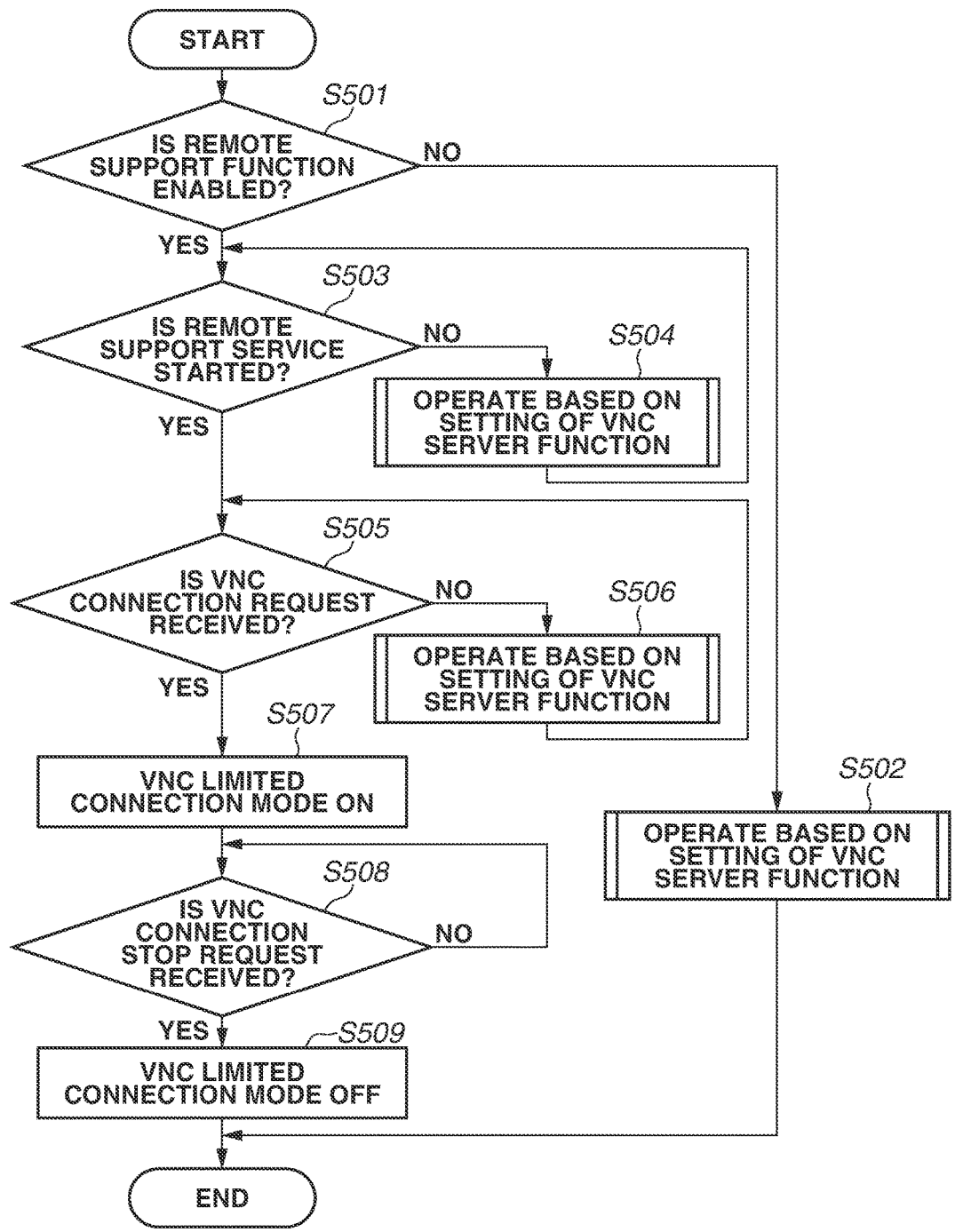
FIG. 5 is a flowchart of processing for enabling a VNC limited connection mode based on setting of the remote support function.

Enabling processing in the VNC limited connection mode with the enabling of the remote support function will be described with reference to FIG. 5. For example, the processing of FIG. 5 is implemented by the CPU 202 of the image forming apparatus 101, executing a program read from a storage medium, such as the ROM 203.

In step S501, the CPU 202 determines whether the remote support function is enabled. If the remote support function is disabled (NO in step S501), the processing proceeds to step S502. In step S502, the CPU 202 operates based on the setting of the VNC server function. The processing of step S502 will be described below with reference to FIG. 7.

If the remote support function is enabled (YES in step S501), the processing proceeds to step S503. In step S503, the CPU 202 determines whether the remote support service is started. As described above, the remote support service is started if a predetermined operation key is continuously pressed for a predetermined time.

If the remote support service is not started (NO in step S503), the processing proceeds to step S504. In step S504, the CPU 202 operates based on the setting of the VNC server function. The determination of step S503 is then repeated. The processing of step S504 will be described below with reference to FIG. 7.

If the remote support service is started (YES in step S503), the processing proceeds to step S505. In step S505, the CPU 202 determines whether a VNC connection request is received. If a VNC connection request is not received (NO in step S505), the processing proceeds to step S506. In step S506, the CPU 202 operates based on the setting of the VNC server function. The determination of step S505 is then repeated. The processing of step S506 will be described below with reference to FIG. 7.

If a VNC connection request is received after a start of the remote support service (YES in step S505), the processing proceeds to step S507. In step S507, the CPU 202 turns the VNC limited connection mode ON. An operation in a case where the VNC limited connection mode is turned ON will be described below with reference to FIG. 6.

In step S508, the CPU 202 determines whether a VNC connection stop request is received. If a VNC connection stop request is not received (NO in step S508), the processing of step S508 is repeated. If a VNC connection stop request is received (YES in step S508), the processing proceeds to step S509. In step S509, the CPU 202 turns the VNC limited connection mode OFF. The processing ends.

According to the above-described processing, the VNC limited connection mode can be enabled if a VNC connection request is received after a start of the remote support function. This is not restrictive, and the VNC limited connection mode may be enabled after a start of the remote support function regardless of whether a VNC connection request is received.

Figure 6:
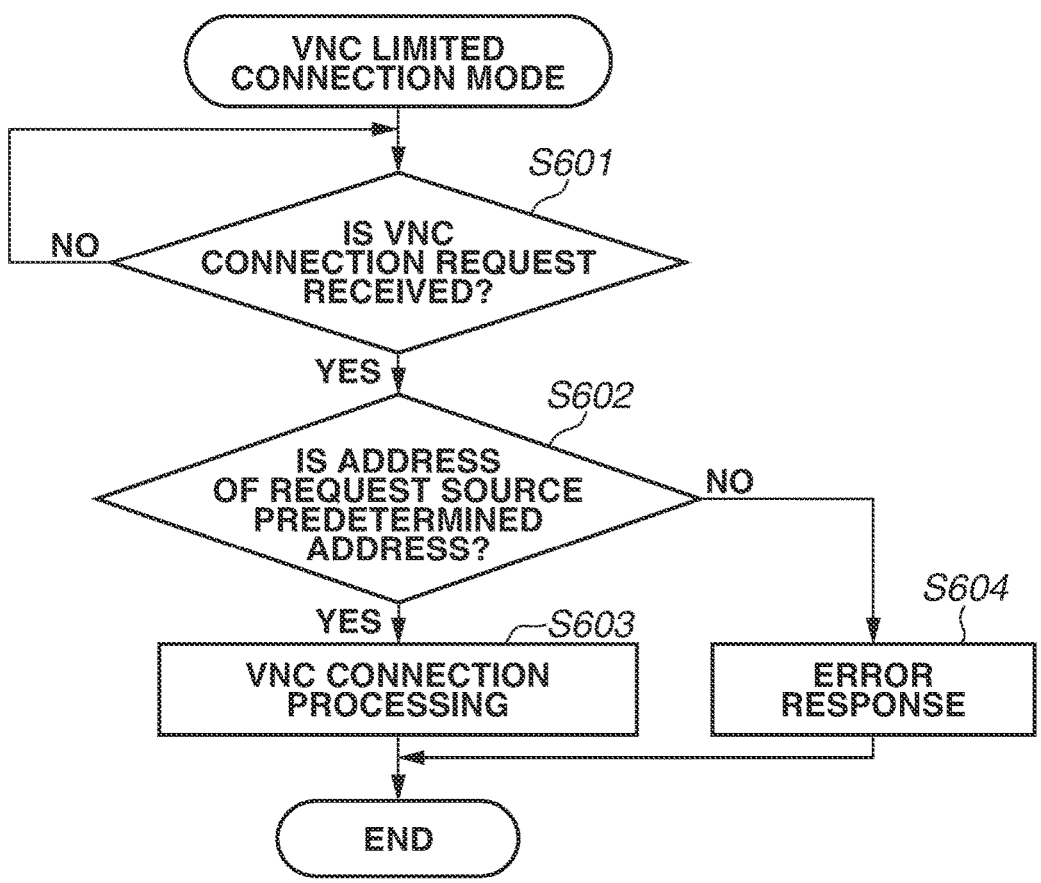
FIG. 6 is a flowchart of processing of an image forming apparatus in the VNC limited connection mode.

Next, an operation in a case where the VNC limited connection mode is enabled will be described with reference to FIG. 6. For example, the processing of FIG. 6 is implemented by the CPU 202 of the image forming apparatus 101, executing a program read from a storage medium, such as the ROM 203.

<Processing in VNC Limited Connection Mode>

An operation of the image forming apparatus 101 in a case where the VNC limited connection mode is enabled will be described with reference to FIG. 6. For example, the processing of FIG. 6 is implemented by the CPU 202 of the image forming apparatus 101, executing a program read from a storage medium, such as the ROM 203. In the present exemplary embodiment, the processing of FIG. 6 is processing performed by the VNC server 251 which is implemented by the CPU 202.

In step S601, the VNC server 251 determines whether a VNC connection request is received. If a VNC connection request is not received (NO in step S601), the processing of step S601 is repeated. If a VNC connection request is received (YES in step S601), the processing proceeds to step S602. In step S602, the VNC server 251 determines whether the address of the request source from which the VNC connection request is transmitted is a predetermined address. The predetermined address is, for example, a local loopback address indicating the IP address of the own apparatus.

If the address of the request source from which the VNC connection request is transmitted is a predetermined one (YES in step S602), the processing proceeds to step S603. In step S603, the VNC server 251 performs VNC connection processing in response to the VNC connection request. If the address of the request source from which the VNC connection request is transmitted is not a predetermined one (NO in step S602), the processing proceeds to step S604. In step S604, the VNC server 251 returns an error response. The processing ends with a VNC connection not being enabled. The error response is not indispensable. The VNC server 251 may simply avoid starting the VNC connection processing in response to the VNC connection request, without returning an error response.

In the present exemplary embodiment, the determination is made based on the IP address of the request source of the VNC connection request. However, this is not restrictive. The VNC connection processing may be performed in a case where the VNC connection request includes information from which the VNC connection request can be identified as being transmitted from the operator PC 102.

<Processing Based on Setting of VNC Server Function>

Figure 7:
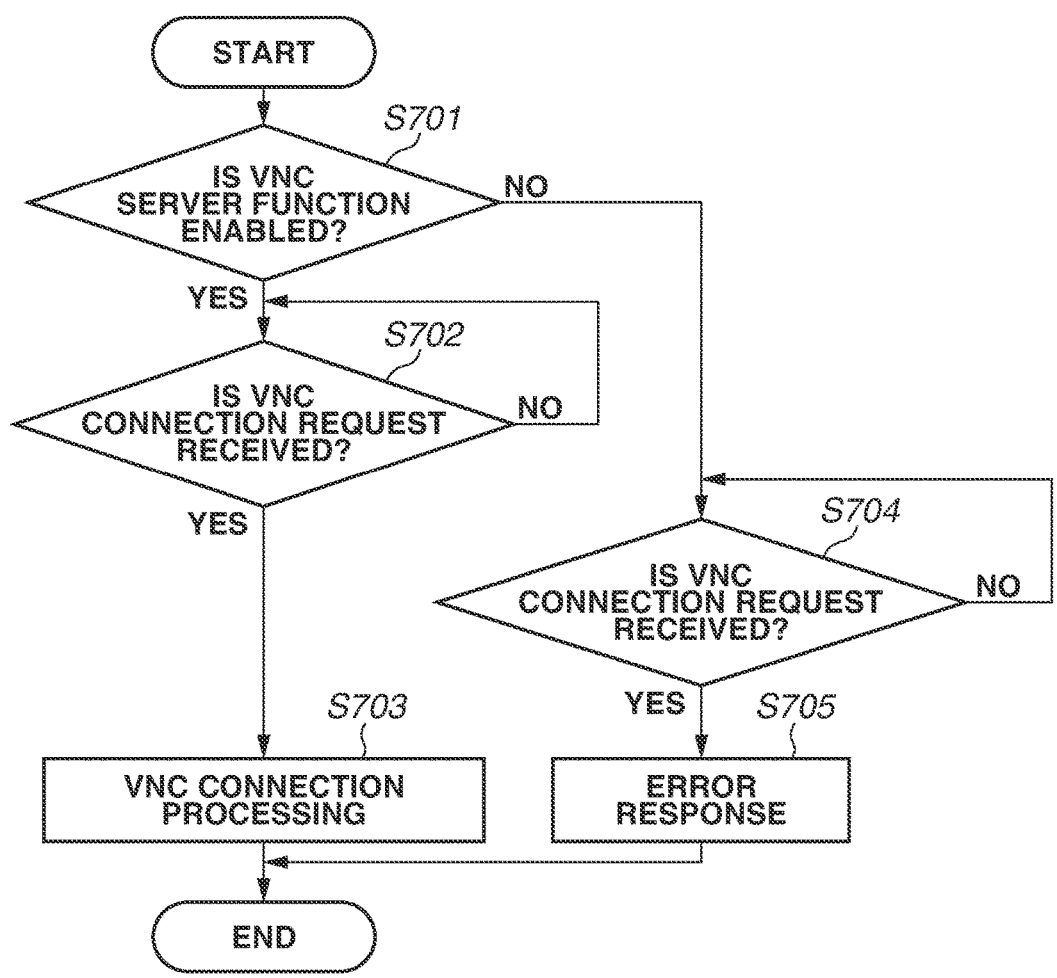
FIG. 7 is a flowchart for illustrating processing based on a VNC server function.

Next, the processing based on the setting of the VNC server function in steps S502, S504, and S506 of FIG. 5 will be described with reference to FIG. 7. The processing of FIG. 7 is implemented by, for example, the CPU 202 of the image forming apparatus 101, executing a program read from a storage medium, such as the ROM 203.

In step S701, the CPU 202 determines whether the VNC server function is enabled. If the VNC server function is enabled (YES in step S701), the processing proceeds to step S702. In step S702, the CPU 202 determines whether a VNC connection request is received. If a VNC connection request is not received (NO in step S702), the processing of step S702 is repeated. If a VNC connection request is received (YES in step S702), the processing proceeds to step S703. In step S703, the CPU 202 performs the VNC connection processing based on the VNC connection request. The processing ends.

If the VNC server function is not enabled (NO in step S701), the processing proceeds to step S704. In step S704, the CPU 202 determines whether a VNC connection request is received. If a VNC connection request is not received (NO in step S704), the processing of step S704 is repeated. If a VNC connection request is received (YES in step S704), the processing proceeds to step S705. In step S705, the CPU 202 returns an error response to the VNC connection request. The processing ends. The error response is not indispensable. The CPU 202 may simply avoid starting the VNC connection processing in response to the VNC connection request, without returning an error response. If the VNC server function is not enabled, the port to be used for a VNC communication may be closed. The port may be kept from entering a connection request waiting state (listen).

<Processing of Relay Server Communication Processing Unit 255>

Figure 8:
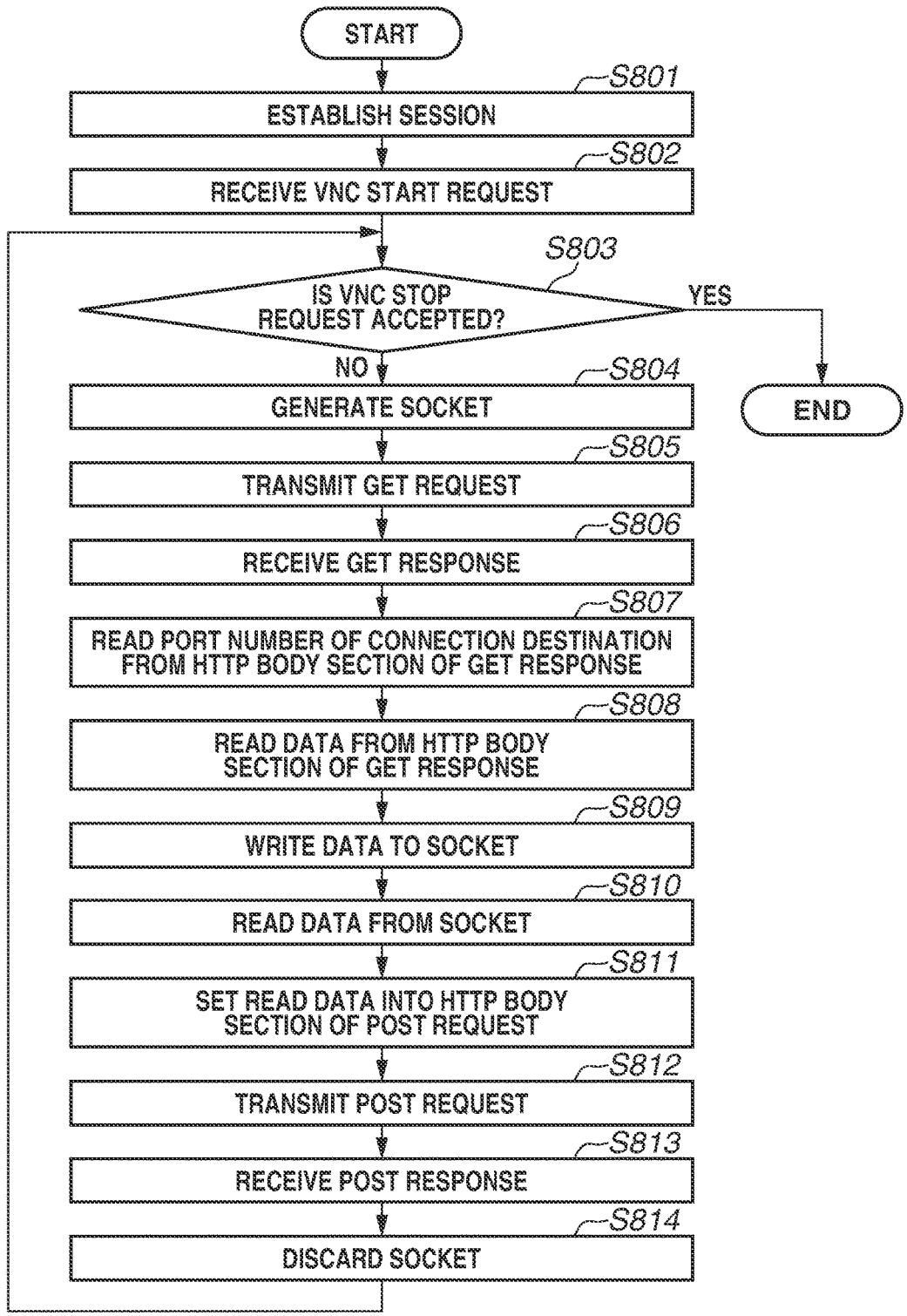
FIG. 8 is a flowchart of processing performed by a relay server communication processing unit.

Next, the processing of the relay server communication processing unit 255 will be described with reference to FIG. 8. The processing of FIG. 8 is implemented by, for example, the CPU 202 of the image forming apparatus 101, executing a program read from a storage medium, such as the ROM 203. In the present exemplary embodiment, the processing of FIG. 8 is performed by the relay server communication processing unit 255 which is implemented by the CPU 202.

The processing illustrated in FIG. 8 is started in response when a predetermined user operation for starting the remote support function is made. In step S801, the relay server communication processing unit 255 of the image forming apparatus 101 accesses the relay server 103 and establishes a session with the operator PC 102 which does remote maintenance.

In step S802, the relay server communication processing unit 255 receives a VNC start request from the relay server 103. The VNC start request, which is transmitted from the relay server 103, is triggered by transmission of a POST request made by the operator PC 102. In other words, the VNC start request is made by the operator PC 102. The relay server communication processing unit 255 receives the VNC start request by transmitting an HTTP GET request to the relay server 103 on a regular basis. Specifically, the relay server communication processing unit 255 detects the VNC start request by reading data "application name: VNC" and "command: start" from the HTTP body section of a GET response.

With a VNC start request accepted in step S802, the processing proceeds to step S803. In step S803, the relay server communication processing unit 255 determines whether a VNC stop request is accepted. If a VNC stop request is accepted (YES in step S803), the processing ends. As in the VNC start request, the relay server communication processing unit 255 receives the VNC stop request by regularly transmitting an HTTP GET request. Specifically, the relay server communication processing unit 255 detects the VNC stop request by reading data "application name: VNC" and "command: stop" from the HTTP body section of a GET response.

If a VNC stop request is not accepted (NO in step S803), the processing proceeds to step S804. In step S804, the relay server communication processing unit 255 initially generates a socket for connecting to the VNC server 251 of the image forming apparatus 101 based on the VNC start request accepted in step S802. Here, which server the socket connects to is not set. If the generation of the socket is completed, then in step S805, the relay server communication processing unit 255 transmits an HTTP GET request to the relay server 103. In step S806, the relay server communication processing unit 255 receives a GET response. If the reception is completed, then in step S807, the relay server communication processing unit 255 obtains the port number of the connection destination from the HTTP body section of the GET response. The value to be obtained here is a value specified by the operator PC 102 (Port=5900). Specifically, the relay server communication processing unit 255 reads the part that follows "Port=" in the HTTP body section. In step S808, the relay server communication processing unit 255 reads data from the HTTP body section of the GET response. Specifically, the relay server communication processing unit 255 reads the part that follows "Data=" in the HTTP body section. The data read in step S808 is data transmitted by the VNC client application (VNC client 261) of the operator PC 102.

If the reading of the data is completed, then in step S809, the relay server communication processing unit 255 specifies a connection destination hostname as "127.0.0.1" and a connection destination port number as the port number obtained in step S807, and connects the socket. The relay server communication processing unit 255 further writes the data read in step S808 to the socket. More specifically, the relay server communication processing unit 255 sets the connection destination (VNC connection request destination) to localhost, e.g., the local loopback address designating the own apparatus. In step S810, the relay server communication processing unit 255 reads data from the socket. In step S810, the relay server communication processing unit 255 can receive data transmitted from the VNC server 251.

In step S811, the relay server communication processing unit 255 sets the data read in step S810 into the HTTP body section of a POST request. Specifically, the relay server communication processing unit 255 writes "Data=XXX (read binary data)". If the HTTP POST request is completed in step S811, then in step S812, the relay server communication processing unit 255 transmits the HTTP POST request to the relay server 103. In step S813, the relay server communication processing unit 255 receives a POST response. If the entire communication is completed, then in step S814, the relay server communication processing unit 255 discards the socket generated in step S804. The processing of steps S803 to S814 is repeated until a VNC stop request is accepted in step S803.

In such a manner, the relay server communication processing unit 255 sets the request destination address of the VNC connection request received from the operator PC 102 via the relay server 103 to the local loopback address. The relay server communication processing unit 255 then transmits the VNC connection request to which the local loopback address is attached to the VNC server 251. Since the request source address is the local loopback address, the VNC server 251 performs the VNC connection processing based on the VNC connection request even if the VNC server 251 is operating in the VNC limited connection mode. The VNC server 251 can thus enable the VNC connection in a case where a VNC connection request is provided from the operator PC 102.

This enables control to enable operating the image forming apparatus 101 by VNC via the network 106 in a case where the VNC connection request is made via a predetermined communication path. Control can also be performed not to enable operating the image forming apparatus 101 by VNC in a case where the VNC connection request is not made via a predetermined communication path. An example of the predetermined communication path is the communication path via the relay server 103.

According to the present exemplary embodiment, control can be performed to enable the VNC client made a request to connect to the VNC server 251 in a case where the VNC connection request is one to which predetermined address information is attached. Control can also be performed not to enable the VNC client made a request to connect to the VNC server 251 in a case where the VNC connection request is not one to which predetermined address information is added. An example of the predetermined address information is an address designating the image forming apparatus 101.

In the present exemplary embodiment, in a case where communication with the operator PC 102 is established and a VNC connection request is received from the operator PC 102, the operation of the image forming apparatus 101 by the operator PC 102 via the network 106 is enabled. In a case where communication with the operator PC 102 is established and a VNC connection request is received from another apparatus than the operator PC 102, control is performed not to enable the operation of the image forming apparatus 101 by another apparatus via the network 106.

As described above, even in a case where the remote support function is set to enabled and the VNC server function is set to disabled via the setting screen 301, the VNC server function can be used to get support, though solely for remote support purposes. For purposes other than remote support, the use of the VNC server function can be disabled.

In a case where the operator PC 102 is in connection with the VNC server 251, the VNC server 251 can be prevented from being connected with another apparatus than the operator PC 102 instead of the operator PC 102. The operator can thus smoothly perform remote support, such as maintenance, on the image forming apparatus 101.

According to the foregoing exemplary embodiment, the function of accepting maintenance by the support apparatus via the network 106 can be switched between enabled and disabled. The operation of the information processing apparatus by the support apparatus can be prevented by disabling the function.

According to the foregoing exemplary embodiment, it is possible to enable operation via the network 106 for the purpose of maintenance by an external apparatus via the network 106, and not enable operation via the network 106 for other purposes. The information processing apparatus can thus be prevented from being operated by an external apparatus via the network 106 for purposes other than maintenance.

As described above, according to the present exemplary embodiment, the operation of the information processing apparatus by an external apparatus via the network 106 can be restricted based on the user's intention.

Figure 9:
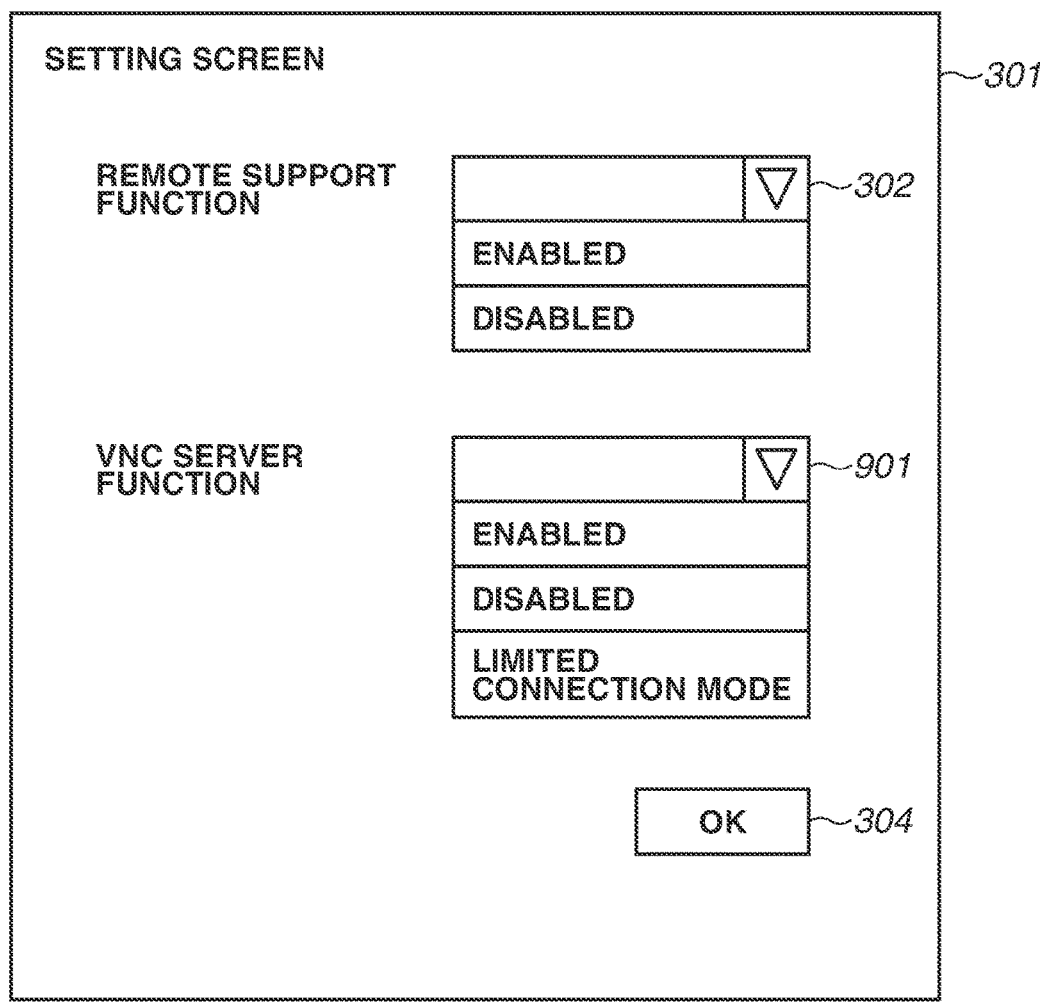
FIG. 9 is a diagram illustrating a modification of a setting screen for switching the remote support function and the VNC server function between enabled and disabled.

The foregoing exemplary embodiment is not seen to be limiting. For example, the user may be allowed to explicitly set the VNC limited connection mode by using a pull-down menu 901 of FIG. 9, in addition to the setting of whether to enable or disable the VNC server function.

In such a case, control may be performed so that the VNC limited connection mode is automatically set as the setting of the VNC server function on the basis that the remote support function is set to enabled.

Alternatively, control may be performed so that the VNC server function is unable to be disabled from the setting screen 301 in a case where the remote support function is enabled. If the VNC server function is made unable to be disabled, the user may be notified of it. The VNC server function can thereby be prevented from being disabled while the remote support function which may involve VNC operations is enabled.

The setting of the VNC server function may be configured not to be changeable to disabled in a case where remote support is already started.

In a case where the VNC server function is set to disabled, control may be performed to automatically disable the remote support function. The remote support function may be configured not to be switchable from disabled to enabled while the VNC server function is disabled. This can automatically make the remote support function, which may involve VNC operations, unusable, on the basis that the user disables the VNC server function with the intention to restrict remote operation of the image forming apparatus 101.

Such processing can also restrict the operation of the information processing apparatus by an external apparatus via the network 106 based on the user's intention. The restriction and the smooth execution of remote support can be achieved in a compatible manner.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-010746, filed Jan. 24, 2017, which is hereby incorporated by reference herein in its entirety.

What is claimed is:

1. An information processing apparatus comprising:
a memory device that stores a set of instructions; and
at least one processor that executes the set of instructions to:
establish a connection with a support apparatus via a relay apparatus;
make a data acquisition request to the relay apparatus,
obtain an operation command to remotely operate the information processing apparatus as a response to the data acquisition request, the operation command being transmitted from the support apparatus to the relay apparatus;
operate the information processing apparatus based on the obtained operation command;
operate, in a case where the information processing apparatus is not communicating with the support apparatus via the relay apparatus, the information processing apparatus based on receipt of a remote operation command from another apparatus other than the relay apparatus; and
restrict, in a case where the information processing apparatus is being remotely operated by the support apparatus via the relay apparatus, operating the information processing apparatus based on the receipt of the remote operation command from the another apparatus.

2. The information processing apparatus according to claim 1, wherein the at least one processor executes the set of instructions to, in a case where the communication with the support apparatus via the relay apparatus is established, restrict operating the information processing apparatus based on a predetermined operation command received from the another apparatus.

3. The information processing apparatus according to claim 1, wherein the at least one processor executes the set of instructions to:
provide a Virtual Network Computing (VNC) server;
receive a connection request to the VNC server from a VNC client as a request that the VNC client remotely operate the information processing apparatus via a network;
transmit, in a case where the received request is a request received from the support apparatus via the relay server, the request to which predetermined address information is attached to the VNC server;
perform, in a case where the predetermined address information is attached to the request, control to enable the VNC client that made the request to connect to the VNC server; and
perform, in a case where the predetermined address information is not attached to the request, control not to enable the VNC client that made the request to connect to the VNC server.

4. The information processing apparatus according to claim 3, wherein the predetermined address information is an address of the information processing apparatus.

5. The information processing apparatus according to claim 1, wherein the at least one processor executes the set of instructions to:
set whether to enable operating the information processing apparatus by VNC; and
enable the support apparatus to operate the information processing apparatus by VNC even in a case where a setting not to enable operating the information processing apparatus by VNC is made.

6. The information processing apparatus according to claim 5, wherein the at least one processor executes the set of instructions to, in a case where the setting not to enable operating the information processing apparatus by VNC is made, not enable another apparatus other than the support apparatus to operate the information processing apparatus by VNC.

7. The information processing apparatus according to claim 1, wherein a remote operation of the information processing apparatus is performed by a VNC client of the support apparatus transmitting an operation instruction to a VNC server provided by the information processing apparatus.

8. A method for controlling an information processing apparatus, comprising:
establishing connection with a support apparatus via a relay apparatus;
making a data acquisition request to the relay apparatus;
obtaining, as a response to the data acquisition request, an operation command to remotely operate the information processing apparatus from the relay apparatus, the operation command being transmitted from the support apparatus to the relay apparatus;
operating the information processing apparatus based on the obtained operation command;
operating, in a case where the information processing apparatus is not communicating with the support apparatus via the relay apparatus, the information processing apparatus based on receipt of a remote operation command from another apparatus other than the relay apparatus; and
restricting, in a case where the information processing apparatus is being remotely operated by the support apparatus via the relay apparatus, operating the information processing apparatus based on the receipt of the remote operation command from the another apparatus.

9. A non-transitory computer readable storage medium storing a program for causing a computer to execute a method, the method comprising:
establishing connection with a support apparatus via a relay apparatus;
making a data acquisition request to the relay apparatus;
obtaining, as a response to the data acquisition request, an operation command to remotely operate the information processing apparatus from the relay apparatus, the operation command being transmitted from the support apparatus to the relay apparatus;
operating the information processing apparatus based on the obtained operation command;
operating, in a case where the information processing apparatus is not communicating with the support apparatus via the relay apparatus, the information processing apparatus based on receipt of a remote operation command from another apparatus other than the relay apparatus; and restricting, in a case where the information processing apparatus is being remotely operated by the support apparatus via the relay apparatus, operating the information processing apparatus based on the receipt of the remote operation command from the another apparatus.

\* \* \* \* \*